(12) United States Patent
Elduayen Madariaga et al.

(10) Patent No.: US 8,459,917 B2
(45) Date of Patent: Jun. 11, 2013

(54) FASTENER AND METHODS THEREOF

(75) Inventors: Juan Andrés Elduayen Madariaga, Aduna (ES); Javier Sanchez Garduño, Irun (ES)

(73) Assignee: Eurar 2020 S.L., Andoain (Gipuzkoa) (ES)

( * ) Notice: Subject to any disclaimer, the term of this patent is extended or adjusted under 35 U.S.C. 154(b) by 330 days.

(21) Appl. No.: 12/811,811

(22) PCT Filed: Dec. 16, 2008

(86) PCT No.: PCT/ES2008/000782
§ 371 (c)(1),
(2), (4) Date: Jul. 6, 2010

(87) PCT Pub. No.: WO2009/087245
PCT Pub. Date: Jul. 16, 2009

(65) Prior Publication Data
US 2010/0278610 A1    Nov. 4, 2010

(30) Foreign Application Priority Data

Jan. 4, 2008  (ES) .................................. 200800007

(51) Int. Cl.
*F16B 13/04* (2006.01)
(52) U.S. Cl.
USPC .............................................. 411/34; 29/508
(58) Field of Classification Search
USPC .................. 411/34, 40, 43, 501, 506; 29/509
See application file for complete search history.

(56) References Cited

U.S. PATENT DOCUMENTS 2,365,372 A * 12/1944 Allen ............................ 248/501
3,013,643 A   12/1961 Perry
(Continued)

FOREIGN PATENT DOCUMENTS

ES    273562 U    12/1983
ES    290910 U     4/1986
(Continued)

OTHER PUBLICATIONS

International Search Report; PCT/ES2008/000782; May 14, 2009.

*Primary Examiner* — Gary Estremsky
(74) *Attorney, Agent, or Firm* — Tim L. Kitchen; Peter B. Scull; Hamilton, DeSanctis & Cha LLP (57) ABSTRACT

A fastener for joining a first member and a second member. In one implementation the fastener includes an elastic hollow body having a proximal end, a distal end, and an axial hole. An elongate rod extends through the elastic hollow body and has a washer positioned at the proximal end of the elastic hollow body. A first head is located at a proximal end of the rod and abuts the washer while a second head is positioned on the rod so that it resides at a distal end of the elastic hollow body. The rod also includes an elongate body that extends distally to the distal end of the elastic hollow body, the rod and elastic hollow body being in non-threaded engagement with one another. The first head has a second diameter greater than the first diameter, the washer has a third diameter greater than the second diameter, the second head has a fourth diameter greater than the second diameter and smaller than the third diameter. The elastic hollow body is axially compressible between the washer and the second head upon an axial force applied to the elongate body in a direction toward the elastic hollow body.

14 Claims, 6 Drawing Sheets

U.S. PATENT DOCUMENTS

| | | | | |
|---|---|---|---|---|
| 3,017,800 A * | 1/1962 | Cohen | | 411/34 |
| 3,306,053 A * | 2/1967 | Fulton | | 405/215 |
| 3,675,881 A | 7/1972 | Caldwell | | |
| 3,895,408 A | 7/1975 | Leingang | | |
| 4,189,977 A * | 2/1980 | Hintz et al. | | 411/34 |
| 6,273,655 B1 * | 8/2001 | McAlpine et al. | | 411/34 |
| 6,868,590 B2 * | 3/2005 | Bentrim | | 24/458 |
| 6,905,295 B2 * | 6/2005 | Stevenson et al. | | 411/34 |
| 7,704,160 B2 * | 4/2010 | Lindner | | 473/297 |
| 2005/0238456 A1 * | 10/2005 | Stinson | | 411/34 |

FOREIGN PATENT DOCUMENTS

| | | |
|---|---|---|
| ES | 2267470 T3 | 6/2001 |
| ES | 2228503 T3 | 6/2002 |
| ES | 2247173 T3 | 7/2003 |
| ES | 2268139 T3 | 9/2004 |
| ES | 2228503 T3 | 4/2005 |
| ES | 2247173 T3 | 3/2006 |
| ES | 2267470 T3 | 3/2007 |
| ES | 2268139 T3 | 3/2007 |
| GB | 2240603 A | 8/1991 |

* cited by examiner

FASTENER AND METHODS THEREOF

CROSS-REFERENCE TO RELATED APPLICATIONS

The present application is related to and claims the benefit and is an 371 international phase filing of international patent application PCT/ES2008/000782, filed Dec. 16, 2008, which is related to and claims the benefit of Spanish Patent Application No. P200800007, filed Jan. 4, 2008.

TECHNICAL FIELD

The present invention relates to fasteners for joining members in spaced cushioned relationship.

BACKGROUND

The current prior art contains various types of rivets for joining a variety of elements. Among these, for example, are Spanish Patent Nos. ES2228503, ES2247173, ES2268139, ES2267470, ES0290910 and ES273562. These known rivets are used to join different materials in a rapid and simple manner but do not prevent the transmission of noise, vibrations and movement between them, and are not adapted to withstand the contracting and expanding of different types of materials.

On the other hand, U.S. Pat. No. 3,013,643 discloses a fastener for joining two members in spaced cushioned relationship, the fastener comprising a connecting element associated with a hollow body of deformable elastomeric material, the connecting element being capable of applying axially directed compressive force to the hollow body to thereby axially shorten and compress and laterally deform the hollow body for riveting the two members.

SUMMARY

An object of the invention is to provide a fastener for joining members in spaced cushioned relationship and methods to do so with a fastener.

In one implementation a fastener is provided that comprises a connecting element associated with a deformable elastic hollow body, the connecting element being capable of applying an axially directed compressive force to the hollow body to thereby axially compress and laterally deform the hollow body for riveting the members. In one implementation the connecting element comprises a rod comprising a head and a washer, the rod being inserted in the hollow body and the hollow body being arranged between the head and the washer so that the hollow body is axially compressed between the head and the washer together with the rod.

In accordance with one implementation, a fastener for joining a first member and a second member is provided that comprises an elastic hollow body having a proximal end, a distal end, and an axial hole having a first diameter; and an elongate rod extending through the elastic hollow body having a washer positioned at the proximal end of the elastic hollow body, a first head located at a proximal end of the rod that abuts the washer, a second head positioned at the distal end of the elastic hollow body, and an elongate body extending distally to the distal end of the elastic hollow body, the rod and elastic hollow body being in non-threaded engagement with one another, at least a portion of the rod that resides between the washer and second head being axially compressible, the first head having a second diameter greater than the first diameter, the washer having a third diameter greater than the second diameter, the second head having a fourth diameter greater than the second diameter and smaller than the third diameter, wherein the elastic hollow body is axially compressible between the washer and the second head upon an axial force applied to the elongate body in a direction toward the elastic hollow body.

In accordance with another implementation, a fastener for joining a first member and a second member that comprises: an elastic hollow body having a proximal end, a distal end, an axial hole having a first diameter, and a peripheral solid projection extending circumferentially about an external surface of the hollow body; and an elongate rod extending through the elastic hollow body having a washer positioned at the proximal end of the elastic hollow body, a first head located at a proximal end of the rod that abuts the washer, a second head positioned at the distal end of the elastic hollow body, and an elongate body extending distally to the distal end of the elastic hollow body, the rod and elastic hollow body being in non-threaded engagement with one another, at least a portion of the rod that resides between the washer and second head being axially compressible, the first head having a second diameter greater than the first diameter, the washer having a third diameter greater than the second diameter, the second head having a fourth diameter greater than the second diameter and smaller than the third diameter, wherein the elastic hollow body is axially compressible between the washer and the second head upon an axial force applied to the elongate body in a direction toward the elastic hollow body, the elongated body of the rod being breakable in order to remove it from the fastener.

In accordance with another implementation, a method for joining a first member having a first through opening of a first diameter with a second member having a second through opening of a second diameter with a fastener is provided where the fastener comprises an elastic hollow body having a proximal end, a distal end, and an axial hole having a third diameter, an elongate rod extending through the elastic hollow body having a washer positioned at the proximal end of the elastic hollow body, a first head located at a proximal end of the rod that abuts the washer, a second head positioned at the distal end of the elastic hollow body, and an elongate body extending distally to the distal end of the elastic hollow body, the rod and elastic hollow body being in non-threaded engagement with one another, at least a portion of the rod that resides between the washer and second head being axially compressible, the first head having a fourth diameter greater than the first diameter, the washer having a fifth diameter greater than the fourth diameter and greater than the first diameter, the second head having a sixth diameter greater than the first diameter and smaller than the first and second diameters, the method comprising: (a) inserting the fastener sequentially through the first and second through openings until the washer abuts the first member so that a portion of the hollow elastic body resides between the first and second members and so that at least a second portion of the hollow elastic body resides distally to the second through opening, and (b) axially driving the elongate body of the rod in a direction toward the elastic hollow body to cause the first portion of the hollow elastic body to compress and expand radially to assume a diameter greater than both the first and second diameters and to cause the second portion of the hollow elastic body to compress and expand radially to assume a diameter greater than the second diameter.

Advantageously, the fasteners and methods of the present invention inhibit the transmission of vibrations and noise between the members joined together.

DETAILED DESCRIPTION

In one implementation a fastener is provided that comprises an elastic hollow body (1), a rod (2) and a washer (3).

Figure 1:
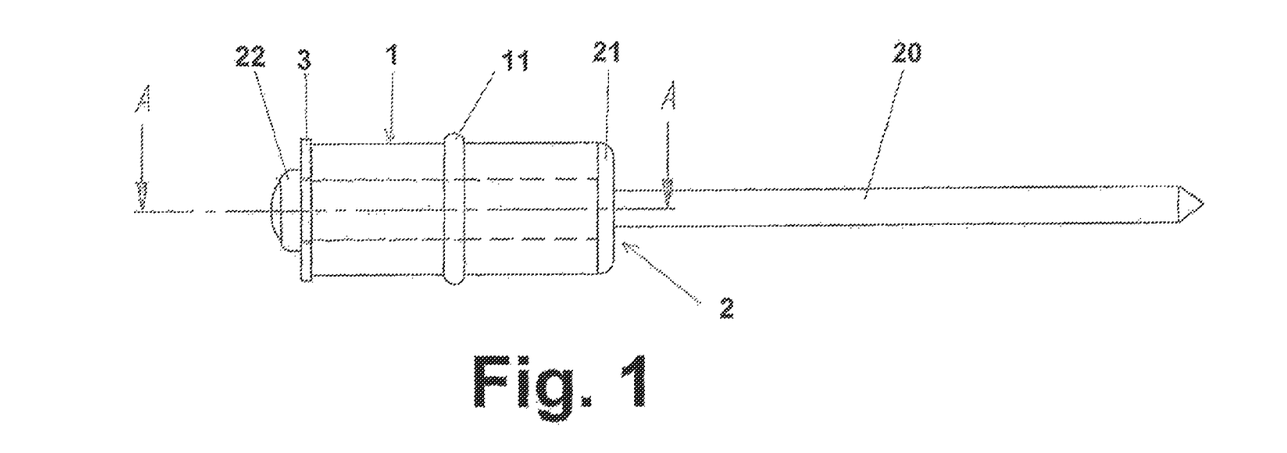
FIG. 1 shows a side view of a fastener according to one implementation.
Figure 2:
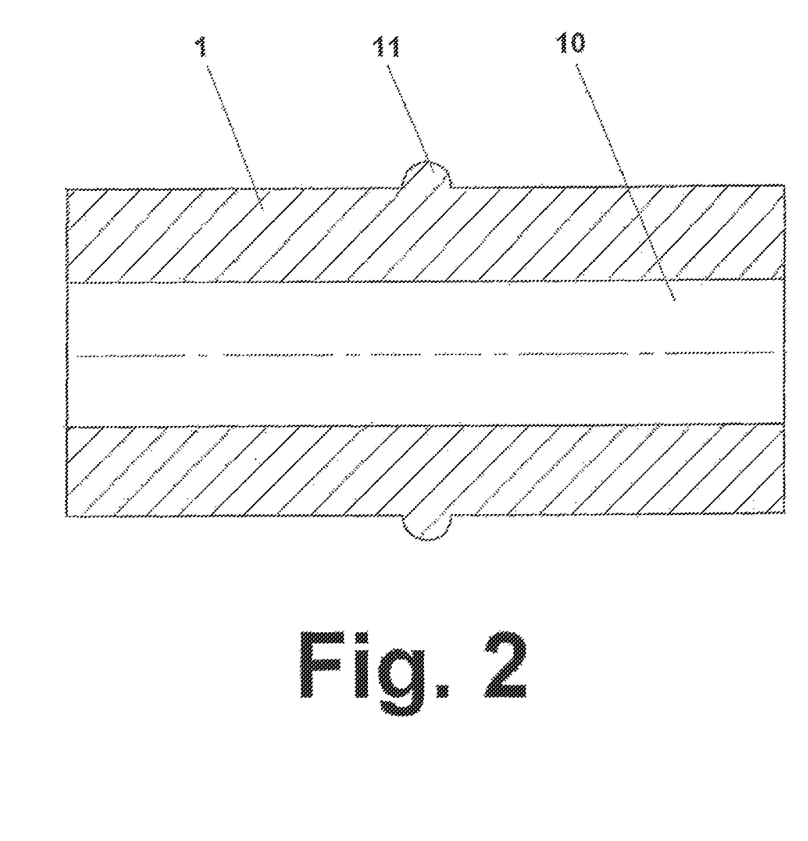
FIG. 2 shows a cross-section of the elastic body taken from an A-A line of the FIG. 1.

According to one implementation, and as shown in FIGS. 1-3, a fastener is provided that is constructed of an elastic hollow body (1) having an axial hole (10) and is preferably a revolving body. In one implementation the elastic hollow body (1) is provided with an external peripheral projection (11). The fastener includes an elongate rod (2) having a first head (21), an elongated body (20), and a second head (22). The rod (2) is housed in the axial hole (10) of said elastic body (1) and has an elongated body (20) that extends distally from the elastic body (1). The elastic body being disposed between the first and second heads (21, 22). The washer (3) is disposed between the second head (22) of the rod (2) and one of the bases of the elastic body (1).

In the fastener of the embodiment shown in the Figures, the compression of the elastic hollow body (1) and the rod (2) is performed by a force exerted by the second head (22) when the elongated body (20) is axially driven. In one implementation the elongated body (20) is breakable in order to remove its end from the fastener after the elongated body (20) is axially driven.

In the embodiment shown in FIG. 1 the fastener has the specific feature of comprising an elastic body (1) with a circular cross-section, and which may be cylindrical or tapered and is provided with an axial hole or through hole (10) into which is fitted a rigid or semi-rigid rod (2) or a conventional rivet. The end of the elongated body (20) is tapered or pointed, and the washer (3) is rigid or semi-rigid.

Figure 3A:
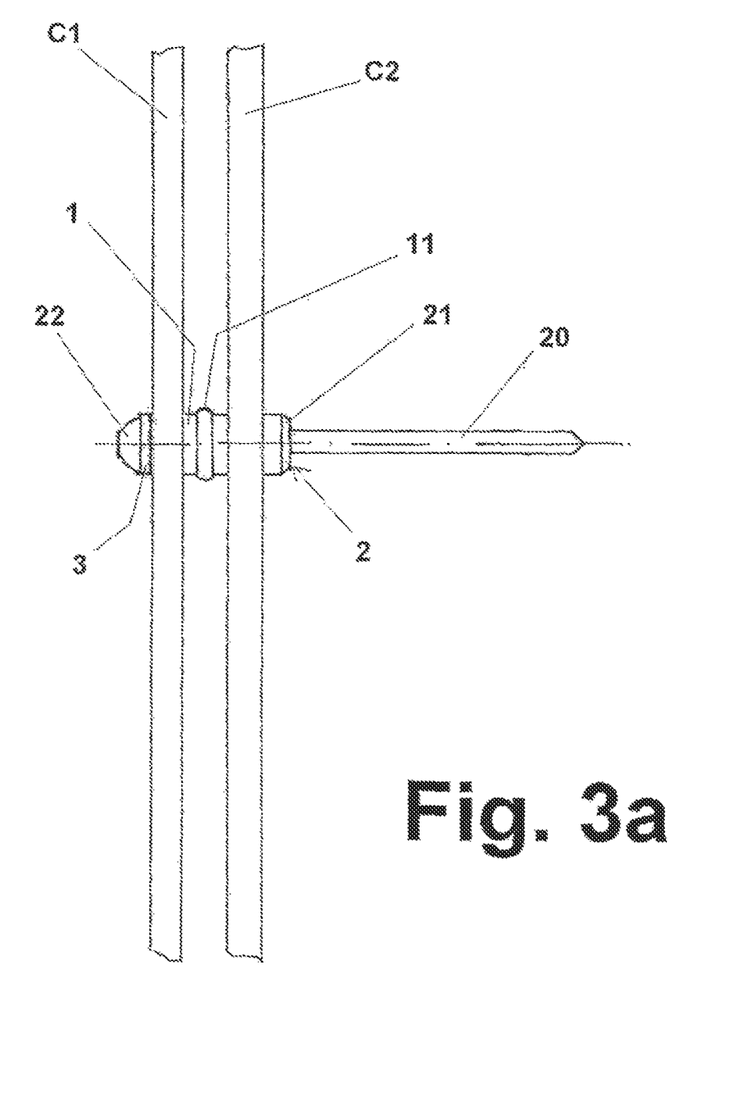
FIGS. 3a to 3d schematically represent the steps of creating an elastic joint between two members with the use of a fastener according to one implementation.
Figure 3B:
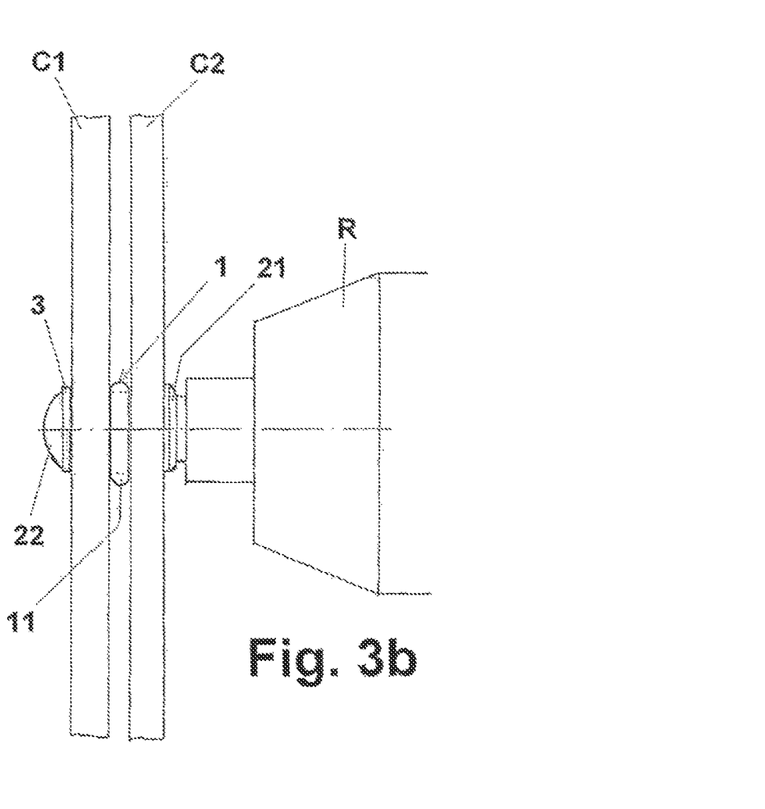
Figure 3C:
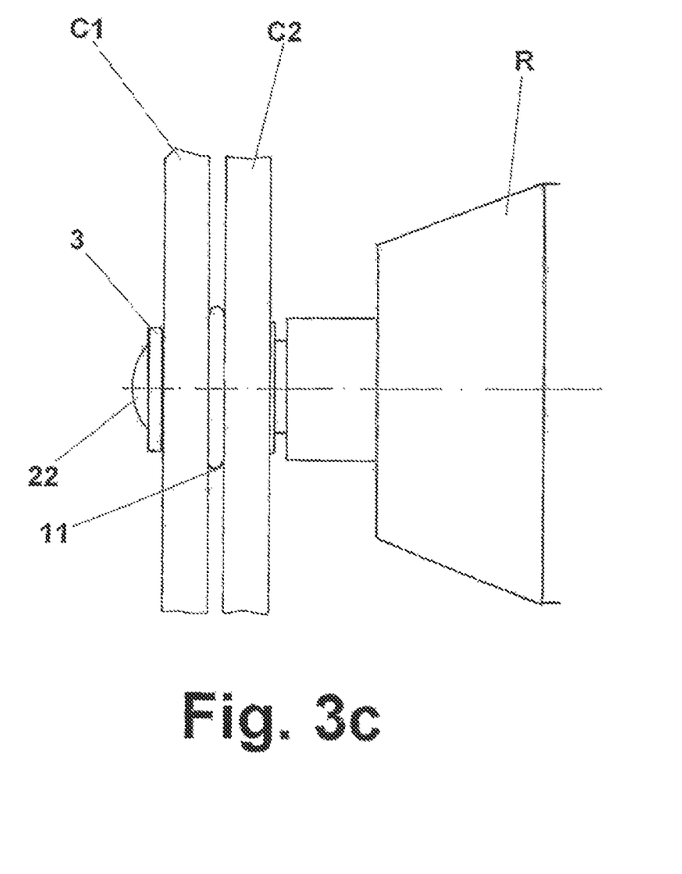
Figure 3D:
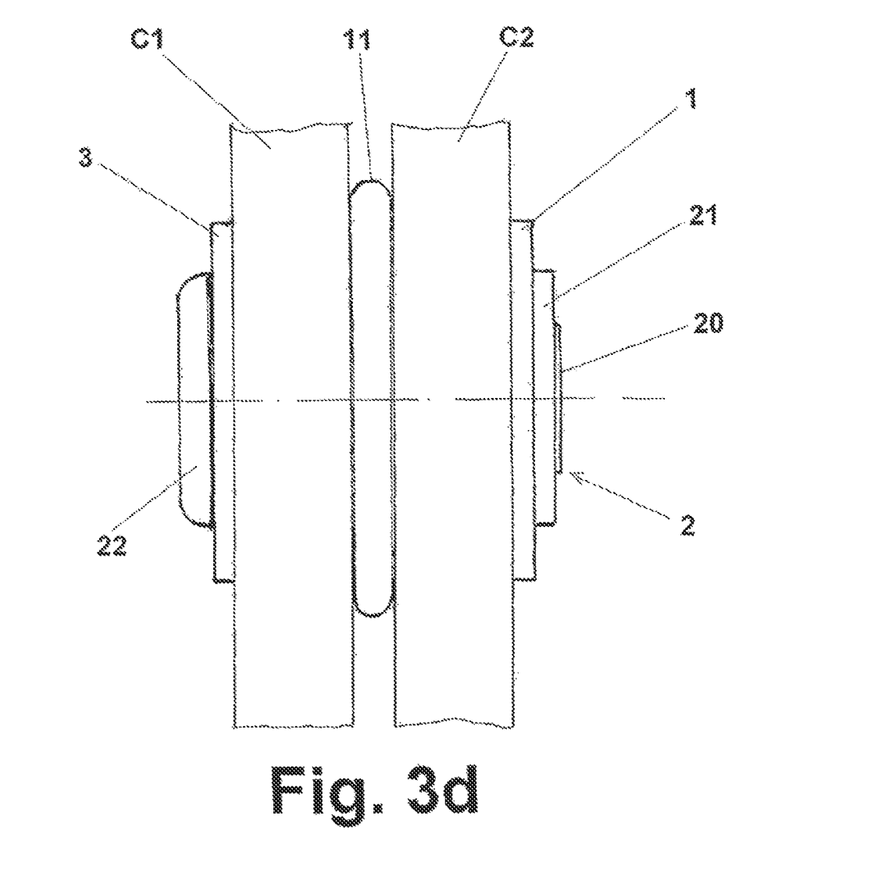

In one implementation the elastic body (1), with the rod (2) and the washer (3) form a single unit that is inserted in the holes of the members (C1), (C2) to be joined, with the result that by means of an appropriate tool, such as a riveter (R), the elongated body (20) of the rod (2) is axially driven, causing it to slide and, as a result, the elastic hollow body (1) to compress between the aforementioned head of the rod (21) and the washer (3), a compression that results in the expansion of the elastic hollow body (1) and the consequent elastic union of the members (C1), (C2). In one implementation, at least a portion of the rod (2) that resides between the first head (21) and washer (3) is collapsible or compressible so as to permit the elastic hollow body (1) to be compressed. In one implementation all, or substantially all, of the rod (2) is compressible in the axial direction. Afterward, the elongated body (20) may be broken and a joint as shown in FIG. 3d is obtained.

FIGS. 3a to 3d show the steps of a method of joining members (C1) and (C2) as described above.

The invention claimed is:

1. A fastener for joining a first member and a second member comprising:
   an elastic hollow body having a proximal end, a distal end, and an axial hole having a first diameter,
   an elongate rod extending through the elastic hollow body having a washer positioned at the proximal end of the elastic hollow body, a first head located at a proximal end of the rod that abuts the washer, a second head positioned at the distal end of the elastic hollow body, and an elongate body extending distally from the distal end of the elastic hollow body, the rod being in non-threaded engagement with the elastic hollow body and the second head, at least a portion of the rod that resides between the washer and second head being axially compressible when an axial force in the direction of the elastic hollow body is applied to the elongate body, the first head having a second diameter greater than the first diameter, the washer having a third diameter greater than the second diameter, the second head having a fourth diameter greater than the second diameter and smaller than the third diameter,
   wherein the elastic hollow body is axially compressible between the washer and the second head upon an axial force applied to the elongate body in a direction toward the elastic hollow body, the rod and elastic hollow body being axially compressible in a manner that results in a radial expansion of the elastic hollow body upon the application of the axial force.

2. A fastener according to claim 1, wherein the elongated body of the rod is breakable in order to remove it from the fastener.

3. A fastener according to claim 1, wherein in a compressed and an uncompressed state the hollow elastic body comprises a peripheral solid projection extending circumferentially about an external surface of the hollow body.

4. A fastener according to claim 1, wherein the proximal end of the hollow elastic body has a fifth diameter that is less than the third diameter and the distal end of the hollow elastic body has a sixth diameter that is greater than or equal to the fourth diameter.

5. A fastener according to claim 1, wherein all, or substantially all, of the rod is compressible in the axial direction.

6. A fastener according to claim 1, wherein the hollow elastic body is a body of revolution.

7. A fastener for joining a first member and a second member comprising:
   an axially compressible elastic hollow body having a proximal end, a distal end, and an axial hole having a first diameter, in a compressed and an uncompressed state the elastic hollow body having a peripheral solid projection extending circumferentially about an external surface of the hollow body, the elastic hollow body having a length with a midpoint located between the proximal and distal ends; and
   an elongate rod extending through the elastic hollow body having a washer positioned at the proximal end of the elastic hollow body, a first head located at a proximal end of the rod that abuts the washer, a second head positioned at the distal end of the elastic hollow body, and an elongate body extending distally from the distal end of the elastic hollow body, the rod being in non-threaded engagement with the elastic hollow body and the second head, at least a portion of the rod that resides between the washer and second head being axially compressible when an axial force in the direction of the elastic hollow body is applied to the elongate body, the first head having a second diameter greater than the first diameter, the washer having a third diameter greater than the second diameter, the second head having a fourth diameter greater than the second diameter and smaller than the third diameter,
   wherein the elastic hollow body is axially compressible along at least a portion of the length thereof that includes the midpoint upon an axial force applied to the elongate body in a direction toward the elastic hollow body, the rod and elastic hollow body being axially compressible in a manner that results in a radial expansion of the elastic hollow body upon the application of the axial force, the elongated body of the rod being breakable in order to remove it from the fastener.

8. A fastener according to claim 7, wherein the proximal end of the hollow elastic body has a fifth diameter that is less than the third diameter and the distal end of the hollow elastic body has a sixth diameter that is greater than or equal to the fourth diameter.

9. A fastener according to claim 7, wherein all, or substantially all, of the rod is compressible in the axial direction.

10. A fastener according to claim 7, wherein the hollow elastic body is a body of revolution.

11. A fastener according to claim 7, wherein the peripheral solid projection is located at or near the midpoint of the elastic hollow body.

12. A method for joining a first member having a first through opening of a first diameter with a second member having a second through opening of a second diameter with a fastener that comprises an elastic hollow body having a proximal end, a distal end, and an axial hole having a third diameter, an elongate rod extending through the elastic hollow body having a washer positioned at the proximal end of the elastic hollow body, a first head located at a proximal end of the rod that abuts the washer, a second head positioned at the distal end of the elastic hollow body, and an elongate body extending distally to the distal end of the elastic hollow body, the rod and elastic hollow body being in non-threaded engagement with one another, at least a portion of the rod that resides between the washer and second head being axially compressible, the first head having a fourth diameter greater than the first diameter, the washer having a fifth diameter greater than the fourth diameter and greater than the first diameter, the second head having a sixth diameter greater than the first diameter and smaller than the first and second diameters, the method comprising: inserting the fastener sequentially through the first and second through openings until the washer abuts the first member so that a portion of the hollow elastic body resides between the first and second members and so that at least a second portion of the hollow elastic body resides distally to the second through opening, and axially driving the elongate body of the rod in a direction toward the elastic hollow body to cause the first portion of the hollow elastic body to compress and expand radially to assume a diameter greater than both the first and second diameters and to cause the second portion of the hollow elastic body to compress and expand radially to assume a diameter greater than the second diameter.

13. A method according to claim 12, further comprising removing at least a substantial portion of the elongate portion of the rod from the fastener.

14. A method according to claim 12, wherein the elongated body of the rod is axially driven by a riveter.

\* \* \* \* \*